(12) United States Patent
Chen et al.

(10) Patent No.: US 10,590,907 B2
(45) Date of Patent: Mar. 17, 2020

(54) DEVICE FOR RETRIVING ENERGY OF FLOWING WATER FOR THE RIVERSIDE

(71) Applicant: National Taiwan Normal University, Taipei (TW)

(72) Inventors: Jung-Hsuan Chen, Taipei (TW); Chin-Guo Kuo, Taipei (TW); Chao-Fu Shu, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 31 days.

(21) Appl. No.: 15/966,427

(22) Filed: Apr. 30, 2018

(65) Prior Publication Data
US 2019/0242358 A1 Aug. 8, 2019

(30) Foreign Application Priority Data
Feb. 5, 2018 (TW) .............................. 107103961 A

(51) Int. Cl.
*F03B 17/06* (2006.01)
(52) U.S. Cl.
CPC ............ *F03B 17/065* (2013.01); *F03B 17/06* (2013.01); *F05B 2210/11* (2013.01); *F05B 2220/706* (2013.01); *F05B 2240/91* (2013.01); *F05B 2260/403* (2013.01); *F05B 2260/50* (2013.01)
(58) Field of Classification Search
USPC ....................................... 290/53, 54; 416/83
See application file for complete search history.

(56) References Cited

U.S. PATENT DOCUMENTS

| | | | | |
|---|---|---|---|---|
| 705,967 A | * | 7/1902 | Roeh .......................... | B63H 1/30 416/83 |
| 802,228 A | * | 10/1905 | Morton ..................... | B63H 1/30 416/83 |
| 905,320 A | * | 12/1908 | Isham ........................ | B63H 1/30 416/83 |
| 1,624,349 A | * | 4/1927 | Mann ....................... | F03B 13/182 416/6 |
| 1,688,032 A | * | 10/1928 | Blair ..................... | F03B 13/1815 60/500 |
| 3,532,067 A | * | 10/1970 | Baker ........................ | B63B 1/28 114/279 |
| 3,927,330 A | * | 12/1975 | Skorupinski ........... | F03B 17/066 290/54 |
| 4,002,416 A | * | 1/1977 | Axford .................. | F03B 13/182 417/330 |

(Continued)

*Primary Examiner* — Pedro J Cuevas
(74) *Attorney, Agent, or Firm* — Muncy, Geissler, Olds & Lowe, P.C.

(57) ABSTRACT

A device for retrieving energy of flowing water for the riverside is disclosed. The device uses a rotating disk to respectively connect with a first blade and a second blade through two rotating bodies. The first blade and the second blade are respectively located at the first position of an upstream side and the second position of a downstream side. Water pushes the first blade under the surface of water to swing from the first position to the second position, thereby rotating the rotating disk by a rotating distance. Thus, the second blade originally arranged over the surface of water reversely swings to the first position. Then, the second blade sinks in the water. Water pushes the second blade to swing to the second position, and the first blade rises and leaves the surface of water to swing to the first position.

8 Claims, 5 Drawing Sheets

(56) References Cited

U.S. PATENT DOCUMENTS

| | | | | |
|---|---|---|---|---|
| 4,053,253 A * | 10/1977 | Coffer | F03B 17/068 | 415/5 |
| 4,170,738 A * | 10/1979 | Smith | F03B 13/185 | 185/30 |
| 4,268,757 A * | 5/1981 | Rogers | F03B 17/063 | 290/53 |
| 4,486,145 A * | 12/1984 | Eldredge | F03D 5/06 | 416/82 |
| 4,525,122 A * | 6/1985 | Krnac | F03D 5/06 | 416/80 |
| 4,541,242 A * | 9/1985 | Thompson, Jr. | F03B 13/1815 | 60/506 |
| 4,580,400 A * | 4/1986 | Watabe | F03B 13/182 | 290/53 |
| 4,595,336 A * | 6/1986 | Grose | F03D 5/06 | 416/79 |
| 4,610,140 A * | 9/1986 | Thompson, Jr. | F03B 13/1815 | 474/148 |
| 4,612,768 A * | 9/1986 | Thompson, Jr. | F03B 13/1815 | 60/506 |
| 4,931,662 A * | 6/1990 | Burton | F03B 13/1815 | 290/42 |
| 5,009,571 A * | 4/1991 | Smith | F03D 5/06 | 416/79 |
| 5,084,630 A * | 1/1992 | Azimi | F03B 13/182 | 290/42 |
| 5,324,169 A * | 6/1994 | Brown | F03B 17/06 | 416/17 |
| 5,708,305 A * | 1/1998 | Wolfe | F03B 13/1815 | 290/42 |
| 5,899,664 A * | 5/1999 | Lawrence | F03B 17/06 | 416/197 A |
| 6,081,043 A * | 6/2000 | Robles Akesolo | F03D 3/067 | 290/44 |
| 6,184,590 B1 * | 2/2001 | Lopez | F03B 13/182 | 290/42 |
| 6,217,284 B1 * | 4/2001 | Lawrence | F03B 17/062 | 415/3.1 |
| 6,323,563 B1 * | 11/2001 | Kallenberg, Jr. | F03B 17/067 | 290/42 |
| 6,523,781 B2 * | 2/2003 | Ragner | A63H 27/002 | 244/153 R |
| 6,652,232 B2 * | 11/2003 | Bolduc | F03B 17/06 | 416/24 |
| 6,726,440 B2 * | 4/2004 | Pollard, V | F03D 5/00 | 415/4.1 |
| 6,825,574 B1 * | 11/2004 | Mooring | F03D 1/00 | 290/1 R |
| 7,023,104 B2 * | 4/2006 | Kobashikawa | B01D 61/10 | 290/42 |
| 7,131,269 B2 * | 11/2006 | Koivusaari | F03B 13/182 | 60/495 |
| 7,411,311 B2 * | 8/2008 | Tal-or | F03B 13/182 | 290/53 |
| 7,632,069 B2 * | 12/2009 | Kelley | F03B 17/06 | 416/80 |
| 7,744,309 B2 * | 6/2010 | Lee | E02B 9/00 | 290/54 |
| 7,834,474 B2 * | 11/2010 | Whittaker | F03B 13/182 | 290/53 |
| 7,839,009 B2 * | 11/2010 | Rink | F03B 13/264 | 290/43 |
| 7,905,705 B2 * | 3/2011 | Kelley | F03B 17/06 | 416/80 |
| 7,964,984 B2 * | 6/2011 | Saavedra | F03D 5/06 | 290/44 |
| 7,989,973 B2 * | 8/2011 | Birkestrand | E02B 9/00 | 290/44 |
| 8,049,357 B2 * | 11/2011 | Saavedra | F03B 17/00 | 290/42 |
| 8,110,937 B2 * | 2/2012 | Finnigan | F03B 13/182 | 290/42 |
| 8,206,106 B2 * | 6/2012 | Syrovy | F03D 3/068 | 416/83 |
| 8,614,520 B2 * | 12/2013 | Rohrer | F03B 13/182 | 290/42 |
| 8,657,575 B2 * | 2/2014 | Morris | F03B 17/06 | 416/79 |
| 8,736,095 B2 * | 5/2014 | Gilchrist | F03B 17/066 | 290/43 |
| 8,884,457 B1 * | 11/2014 | Jones | F03B 17/06 | 290/54 |
| 9,291,147 B2 * | 3/2016 | Jones | F03B 17/06 | |
| 9,752,551 B2 * | 9/2017 | Jarvinen | F03B 13/182 | |
| 9,752,553 B2 * | 9/2017 | Bein | F03B 13/1885 | |
| 9,777,709 B2 * | 10/2017 | Dysarsz | C25B 1/04 | |
| 9,863,395 B2 * | 1/2018 | Rohrer | F03B 13/182 | |
| 10,072,630 B2 * | 9/2018 | Bein | F03B 13/1885 | |
| 10,208,731 B2 * | 2/2019 | Kerr | F03B 17/06 | |
| 2003/0123983 A1 * | 7/2003 | Bolduc | F03B 17/06 | 416/6 |
| 2004/0007881 A1 * | 1/2004 | Kobashikawa | B01D 61/10 | 290/53 |
| 2005/0066654 A1 * | 3/2005 | Koivusaari | F03B 13/182 | 60/398 |
| 2006/0150626 A1 * | 7/2006 | Koivusaari | F03B 13/182 | 60/499 |
| 2007/0297903 A1 * | 12/2007 | Morris | F03B 17/06 | 416/132 A |
| 2008/0148723 A1 * | 6/2008 | Birkestrand | E02B 9/00 | 60/327 |
| 2008/0191485 A1 * | 8/2008 | Whittaker | F03B 13/182 | 290/53 |
| 2009/0015014 A1 * | 1/2009 | Devaney | F03B 13/264 | 290/53 |
| 2009/0121490 A1 * | 5/2009 | Platzer | F03B 17/00 | 290/55 |
| 2009/0224549 A1 * | 9/2009 | Williams | F03D 5/06 | 290/55 |
| 2009/0224551 A1 * | 9/2009 | Williams | F03D 5/06 | 290/55 |
| 2010/0140933 A1 * | 6/2010 | Finnigan | F03B 13/264 | 290/43 |
| 2010/0327597 A1 * | 12/2010 | Patel | F03B 17/063 | 290/54 |
| 2011/0030361 A1 * | 2/2011 | Gopalswamy | F03D 5/06 | 60/398 |
| 2011/0062715 A1 * | 3/2011 | Dimaggio | F03B 17/066 | 290/54 |
| 2012/0313376 A1 * | 12/2012 | Browning, Jr. | F03B 17/068 | 290/54 |
| 2013/0187387 A1 * | 7/2013 | Gilchrist | F03B 17/066 | 290/54 |
| 2019/0331088 A1 * | 10/2019 | Durham | F03B 17/06 | |

\* cited by examiner

DEVICE FOR RETRIVING ENERGY OF FLOWING WATER FOR THE RIVERSIDE

This application claims priority for Taiwan patent application no. 107103961 filed on Feb. 5, 2018, the content of which is incorporated by reference in its entirety.

BACKGROUND OF THE INVENTION

Field of the Invention

The present invention relates to a power generating device, particularly to a device for retrieving energy of flowing water for the riverside.

Description of the Related Art

Power generation, such as nuclear power generation, thermal generation, hydroelectric power generation, or solar power generation, has disadvantages. For example, nuclear power generation produced nuclear waste, and thermal generation resulted in air pollution. Thus, hydroelectric power generation and solar power generation should be the most environmental choices. Nowadays, people advocate green energy, power saving, and carbon reduction. As a result, there are many solar panels installed in sunny areas. The solar panels receive solar energy to generate power. However, the solar panels have an expensive cost.

Hydroelectric power generation converts the potential energy of water into electricity. In this way, the energy of flowing water for the riverside is retrieved. For example, the blades of a water wheel convert kinetic energy into mechanical energy. Since the blades of the water wheel located in a river have complicated structures, the blades are inconveniently preserved and installed. Thus, the river in the far distance is inconveniently installed with many water wheels, such that the amount of retrieved energy of flowing water is limited, which is a disadvantage. To overcome the abovementioned problems, the present invention provides a device for retrieving energy of flowing water for the riverside, so as to solve the afore-mentioned problems of the prior art.

SUMMARY OF THE INVENTION

A primary objective of the present invention is to provide a device for retrieving energy of flowing water for the riverside, which commonly drives two blades and a rotating disk. When flowing water pushes a blade to rotate the rotating disk, the rotating disk moves another blade to the upstream side over the surface of water. The flowing water pushes the blade sinking in water of the upstream side, so as to move the previous blade back. The blades alternately reciprocate and swing to retrieve the energy of flowing water. The blades have simple structures.

Another objective of the present invention is to provide a device for retrieving energy of flowing water for the riverside, which is arranged on a river bank rather than in a river. The device is conveniently maintained, preserved, and installed.

To achieve the abovementioned objectives, the present invention provides a device for retrieving energy of flowing water for the riverside, which is arranged at a riverside of a river. The device for retrieving energy of flowing water for the riverside comprises: a rotating disk; a first rotating body and a first blade arranged at a first position of an upstream side of the river; a second rotating body and a second blade arranged at a second position of a downstream side of the river; a set of first connecting rods fixed to the first rotating body, an end of the set of first connecting rods is connected with the first blade, and another end of the set of first connecting rods is connected with the rotating disk; a set of second connecting rods fixed to the second rotating body, an end of the set of second connecting rods is connected with the second blade, and another end of the set of second connecting rods is connected with the rotating disk; and wherein water pushes the first blade under a surface of the water to swing from the first position to the second position, thereby rotating the rotating disk and reversely swinging the second blade over the surface of the water from the second position to the first position, the second blade sinks in the water, the water pushes the second blade to swing to the second position and rotate the rotating disk, thereby swinging the first blade over the surface of the water to the first position, and the first blade and the second blade alternately reciprocate and paddle to output a thrust of a stream.

According to an embodiment of the present invention, the first blade is provided with a paddling rod to sleeve one of the first connecting rods, and the second blade is provided with a paddling rod to sleeve one of the second connecting rods.

According to an embodiment of the present invention, each of the first rotating body, the second rotating body, and the rotating disk is fixed at the riverside using a fixing post.

According to an embodiment of the present invention, the first rotating body is provided with a pulley and a horizontal sliding rod, the pulley is wound by a cord with two ends thereof respectively connected with the first blade and the first rotating body, and the fixing post is provided with a cord pushing rod, the cord pushing rod pushes the cord, and the cord pulls the first blade to rise using the pulley and the horizontal sliding rod.

Continuing from the abovementioned description, the pulley and the horizontal sliding rod are arranged on a fixing board, and the fixing board is fixed to one the first connecting rods and vertical to it.

Continuing from the abovementioned description, the paddling rod is provided with a ratchet base, and an upper surface of the ratchet base is provided with a plurality of ratchet teeth, and the fixing board is provided with a ratchet claw, and the ratchet claw rotates on the fixing board. The plurality of ratchet teeth are combined with the ratchet claw, and the ratchet claw rotates by gravity to unidirectionally rotate the plurality of ratchet teeth.

Continuing from the abovementioned description, the second rotating body is provided with a pulley and a horizontal sliding rod, the pulley is wound by a cord with two ends thereof respectively connected with the second blade and the second rotating body, and the fixing post is provided with a cord pushing rod, the cord pushing rod pushes the cord, and the cord pulls the second blade to rise using the pulley and the horizontal sliding rod.

Continuing from the abovementioned description, the pulley and the horizontal sliding rod are arranged on a fixing board, and the fixing board is fixed to one the second connecting rods and vertical to it.

Continuing from the abovementioned description, the paddling rod is provided with a ratchet base, and an upper surface of the ratchet base is provided with a plurality of ratchet teeth, and the fixing board is provided with a ratchet claw, and the ratchet claw rotates on the fixing board. The plurality of ratchet teeth are combined with the ratchet claw, and the ratchet claw rotates by gravity to unidirectionally rotate the plurality of ratchet teeth.

Below, the embodiments are described in detail in cooperation with the drawings to make easily understood the technical contents, characteristics and accomplishments of the present invention.

DETAILED DESCRIPTION OF THE INVENTION

The present invention provides a device for retrieving energy of flowing water for the riverside, which is arranged on the river bank of a river and uses flowing water to paddle blades to endlessly retrieve the energy of flowing water.

Figure 1A:
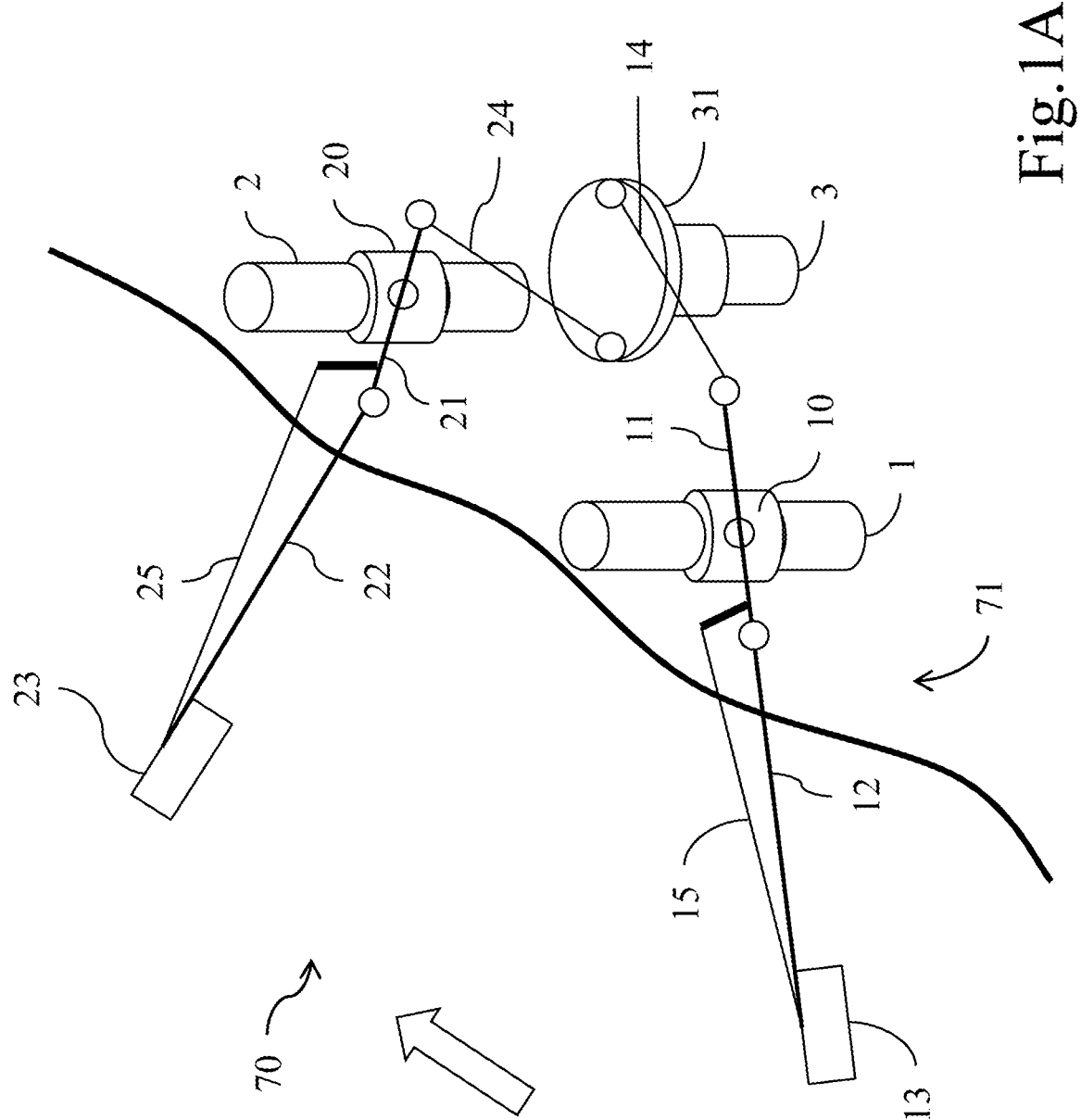
FIG. 1A is a diagram showing a device for retrieving energy of flowing water for the riverside according to an embodiment of the present invention.

Refer to FIG. 1A. FIG. 1A is a diagram showing a device for retrieving energy of flowing water for the riverside according to an embodiment of the present invention. The device comprises a rotating disk 31, a first rotating body 10, a first blade 13, a second rotating body 20, and a second blade 23. The first rotating body 10 and the first blade 13 are arranged at the first position of the upstream side of a river. The second rotating body 20 and the second blade 23 are arranged at the second position of the downstream side of the river. In FIG. 1a, a river 70 is arranged at the left side, the riverside 71 is arranged at the right side, an arrow on the river 70 represents the direction of a stream, a set of first connecting rods 11 and 14 are fixed to the first rotating body 10, and a set of second connecting rods 21 and 24 are fixed to the second rotating body 20. An end and another end of the set of first connecting rods 11 and 14 are respectively connected with the first blade 13 and the rotating disk 31. An end and another end of the set of second connecting rods 21 and 24 are respectively connected with the second blade 23 and the rotating disk 31.

The rotating disk 31 is fixed at the riverside 71 using a fixing post 3. The first rotating body 10 is fixed at the riverside 71 using a fixing post 1. The second rotating body 20 is fixed at the riverside 71 using a fixing post 2.

The first blade 13 is provided with a paddling rod 12 to sleeve the first connecting rod 11. The second blade 23 is provided with a paddling rod 22 to sleeve the second connecting rod 21. The paddling rods 12 and 22 swing the first blade 13 and the second blade 23.

Figure 1B:
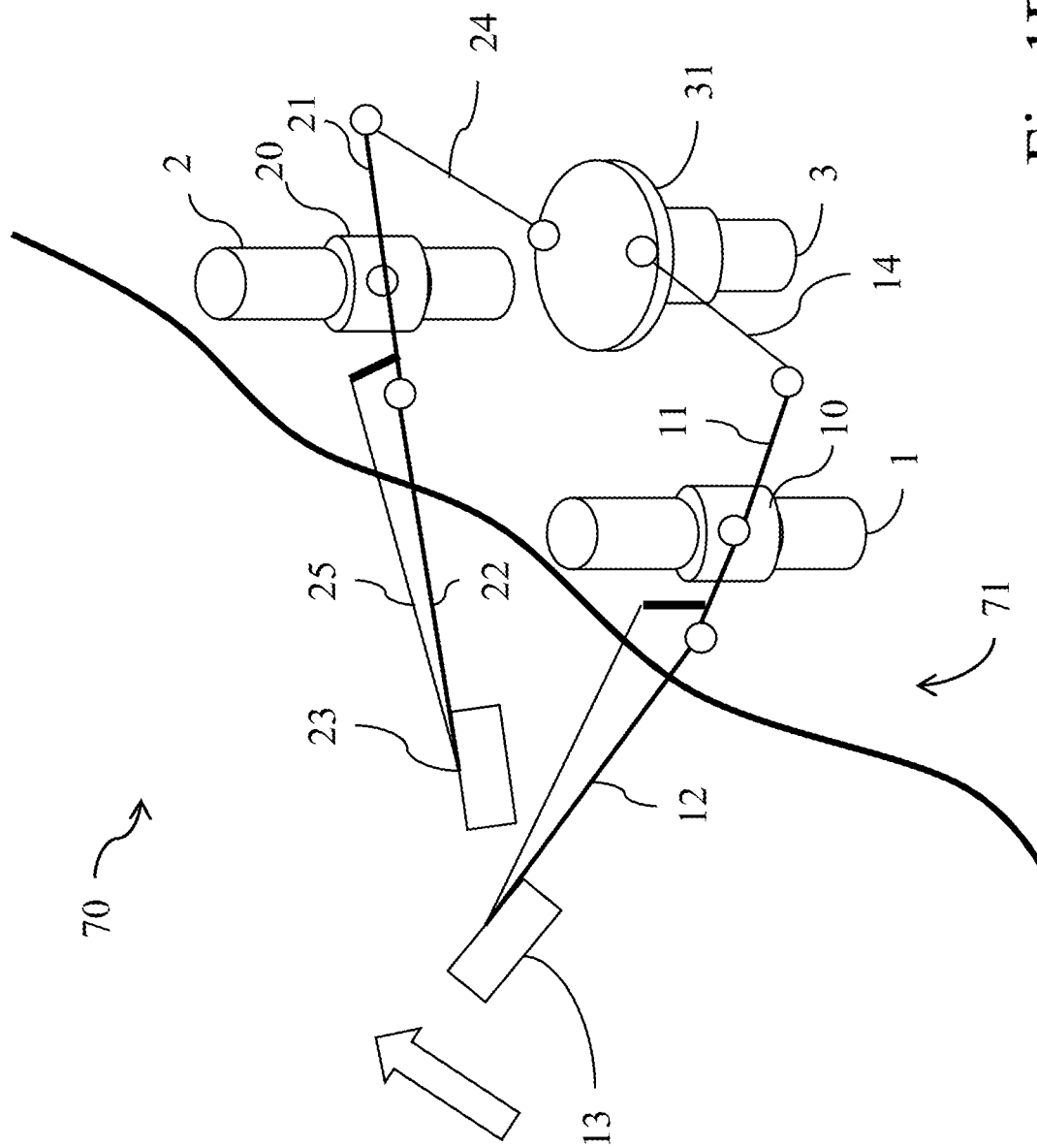
FIG. 1B is a diagram showing a device for retrieving energy of flowing water for the riverside after swinging blades according to an embodiment of the present invention.
Figure 2:
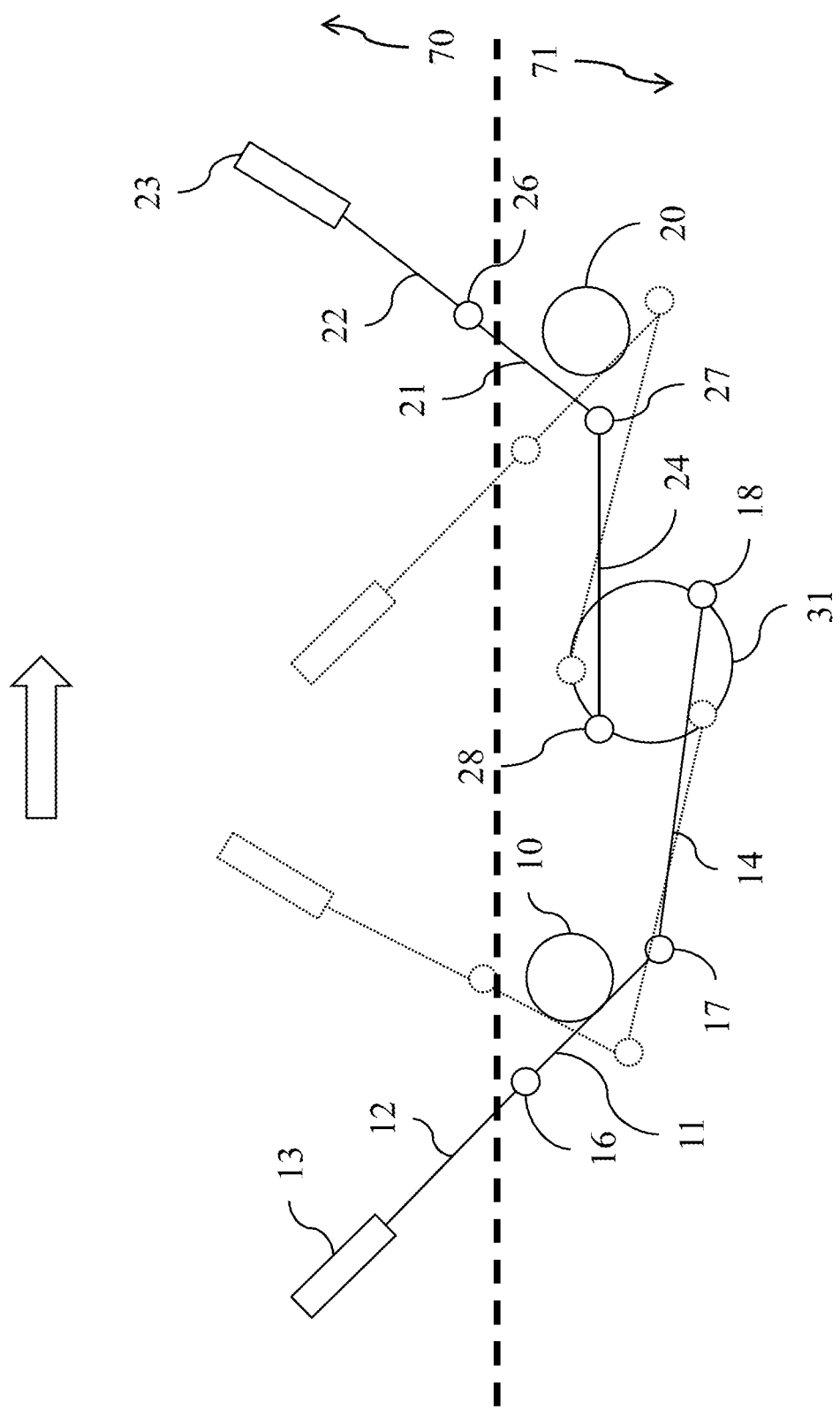
FIG. 2 is a top view of the operation of a device for retrieving energy of flowing water for the riverside according to an embodiment of the present invention.

Refer to FIG. 1B and FIG. 2. FIG. 1B is a diagram showing a device for retrieving energy of flowing water for the riverside after swinging blades according to an embodiment of the present invention. FIG. 2 is a top view of the operation of a device for retrieving energy of flowing water for the riverside according to an embodiment of the present invention. In the present invention, there is a rotating axle 17 between the first connecting rods 11 and 14, and there is a rotating axle 16 between the first connecting rod 11 and the paddling rod 12. Thus, the first blade 13, the paddling rod 12, and the first connecting rods 11 and 14 swing with the first rotating body 10. Likewise, there is a rotating axle 27 between the second connecting rods 21 and 24, and there is a rotating axle 26 between the second connecting rod 21 and the paddling rod 22. Thus, the second blade 23, the paddling rod 22, and the second connecting rods 21 and 24 swing with the second rotating body 20. Besides, there is a rotating axle 18 at a joint between the first connecting rod 14 and the rotating disk 31, and there is a rotating axle 28 at a joint between the second connecting rod 24 and the rotating disk 31. As a result, the first rotating body 10 and the second rotating body 20 use the first connecting rod 14 and the second connecting rod 24 connected with the rotating disk 31 to rotate the rotating disk 31.

When the first blade 13 is located under the surface of water, the first blade 13 is displaced due to the thrust of water. The first blade 13 swings from the first position of the upstream side to the second position of the downstream side. The first connecting rods 11 and 14 clockwise rotate to drive the second connecting rod 24, such that the direction of displacing the second blade 23 is contrary to the direction of the stream. In this way, the first blade 13 originally located over the surface of water and at the second position of the downstream side swings to the first position of the upstream side in a direction contrary to the direction of the stream.

There is a distance between the first blade 13 and the second blade 23 that are arranged near the riverside. The distance allows the first blade 13 and the second blade 23 to swing rather than to interfere with each other. When the surface of the first blade 13 sinks in the river 70, the first blade 13 is displaced due to the thrust of flowing water. Simultaneously, the first rotating body 10 swings a rotating distance. Afterwards, the first blade 13 rises to leave the river 70 and swings back to its original position. Afterwards, the first blade 13 sinks in the river 70 and receives the thrust of flowing water to repeat the abovementioned process. Since the surface of the second blade 23 sinks in the river 70 to receive the thrust of flowing water, the first blade 13 swings to its original position. The second blade 23 uses the rotating disk 31 to apply a thrust. Thus, the first blade 13 and the second blade 23 alternately swing. On the other hand, the thrust of the first blade 13 helps the second blade 23 swing to its original position. As a result, one of the first blade 13 and the second blade 23 swings to generate a thrust. Accordingly, the first blade 13, the second blade 23, the first rotating body, and the second rotating body automatically and continuously output a thrust, wherein the magnitude of the output thrust depends on the areas of the first blade 13 and the second blade 23.

Figure 3:
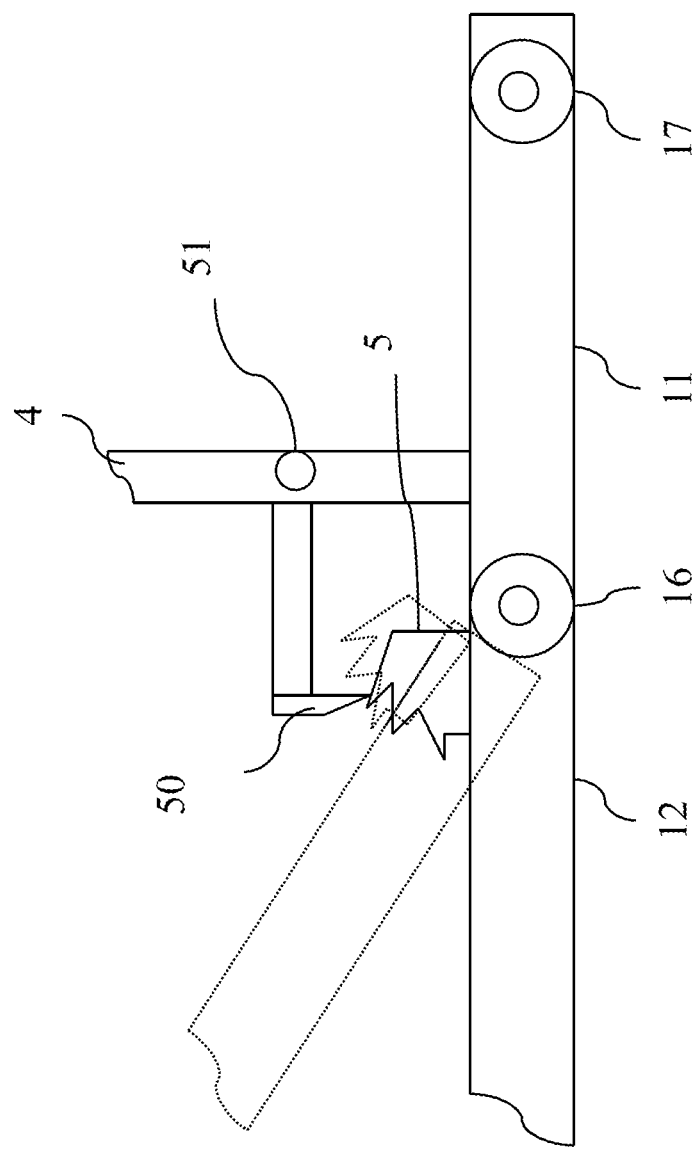
FIG. 3 is a diagram showing a device for retrieving energy of flowing water for the riverside with a connecting rod provided with a ratchet base according to an embodiment of the present invention.

Refer to FIG. 3. There is a rotating axle 16 between the first connecting rod 11 and the paddling rod 12. There is a ratchet base 5 having a shape of an umbrella at a joint between the first connecting rod 11 and the paddling rod 12. The ratchet base 5 is fixed on the paddling rod 12. The upper surface of the ratchet base 5 is provided with a plurality of ratchet teeth combined with an end of a ratchet claw 50. Another end of the ratchet claw 50 sleeves a fixing board 4 through a rotating axle 51. The fixing board 4 is fixed to the first connecting rod 11. Since the ratchet claw 50 engages with the ratchet teeth by gravity at any time, the ratchet teeth can unidirectionally rotate. In other words, when the first blade 13 rises, the ratchet teeth rotates with the rotating axle 16 of the paddling rod 12 being a center. The ratchet claw 50 locks the ratchet teeth when the first blade 13 intends to descend. Thus, the first blade 13 maintains at a certain height rather than descends. When the first blade 13 maintains at a certain height, and the ratchet claw 50 receives an upward thrust to leave the ratchet teeth, the first blade 13 automatically descends by gravity. The principle that the second blade rises and descends is the same to that of the first blade in FIG. 3 so will not be reiterated.

Figure 4:
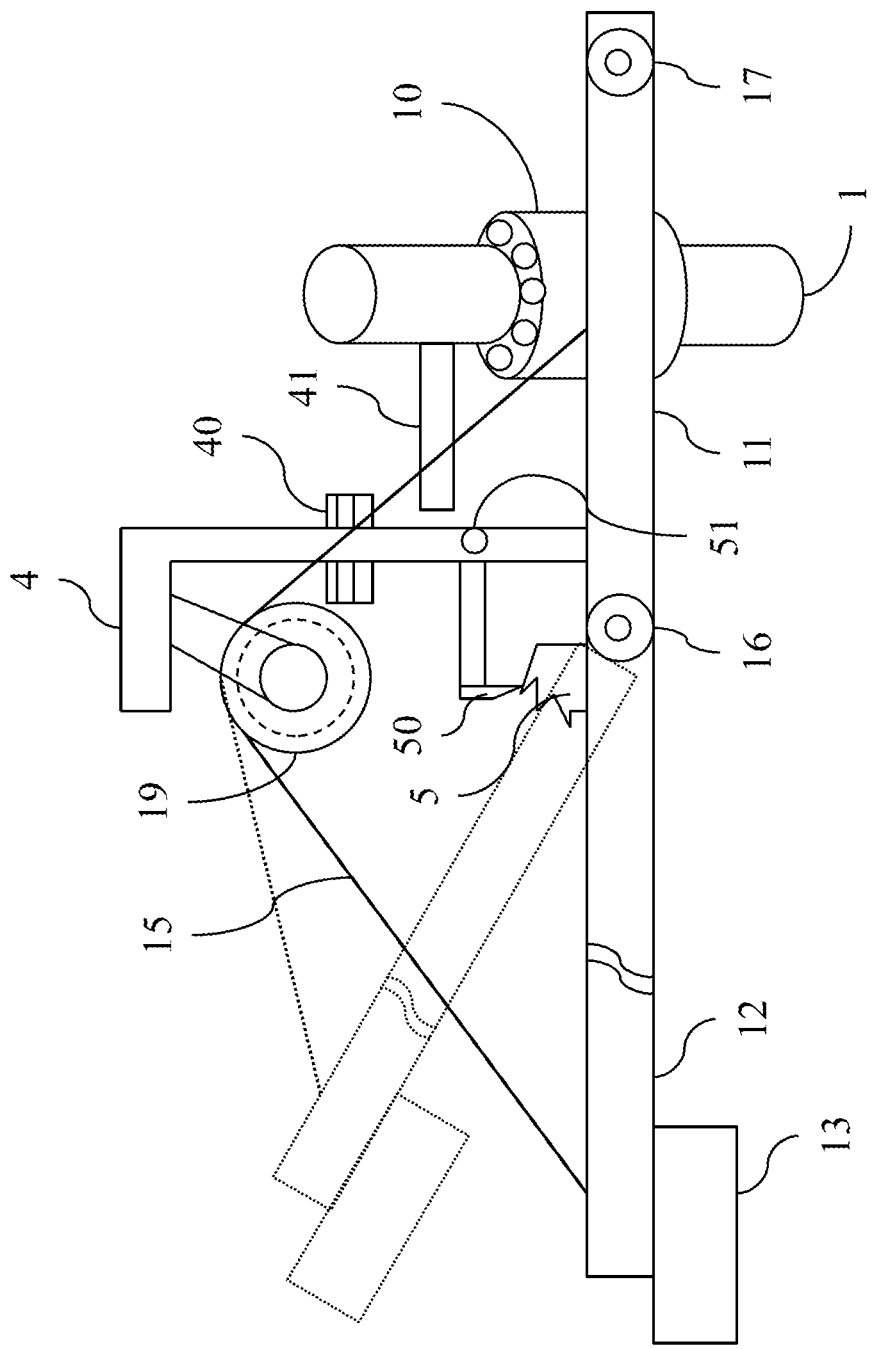
FIG. 4 is a diagram showing a device for retrieving energy of flowing water for the riverside with a first rotating body and a first blade according to an embodiment of the present invention.

Refer to FIG. 4. Taking the first blade 13 as an example. The first blade 13 is fixed at the tail end of the paddling rod 12. An end of a cord 15 is fixed to the tail end of the paddling rod 12, and another end of the cord 15 is fixed to the first connecting rod 11 of the first rotating body 10. A pulley 19 is vertical to a sliding rod 40, such that a strain is applied on the cord 15. The pulley 19 and the sliding rod 40 are fixed to a fixing board 4. The fixing board 4 is fixed to the first connecting rod 11 of the first rotating body 10. A fixing post 1 of the first rotating body 10 is provided with a cord pushing rod 41. Thus, the cord pushing rod 41 and the first rotating body 10 move in relation to each other. The first rotating body 10 rotates by a rotating distance, which represents that the first blade 13 is displaced by the thrust of flowing water. The cord pushing rod 41 pushes the cord 15 when the first rotating body 10 rotates. Then, the cord 15 pulls the first blade 13 through the sliding rod 40 and the pulley 19, such that the first blade 13 rises. The operation of the second blade is the same to that of the first blade 13 in FIG. 4 so will not be reiterated. Apparently, the first blade or the second blade of the present invention firstly sinks in water and receives the thrust of flowing water to swing a distance. Afterwards, the first blade or the second blade rises and leaves the surface of water. Then, the first blade or the second blade maintains at a height and swings to its original position, and repeatedly sinks in water to receive the thrust of flowing water and to swing a distance. Since the first blade and the second blade alternately swing. For example, the first blade sinks in water and receives the thrust of water to swing, and the second blade leaves the surface of water and swings to its original position. Then, the second blade sinks in water and receives the thrust of water to swing, and the first blade leaves the surface of water and swings to its original position. As a result, the first blade and the second blade alternately and repeatedly swing. One of the blades outputs a thrust, thereby retrieving the energy of flowing water of the river by rotating the rotating disk.

In conclusion, the device for retrieving energy of flowing water for the riverside of the present invention comprises a rotating disk and two blade swinging device each consisting of a blade, a rotating body, and a set of connecting rods. The first rotating body and the second rotating body are fixed at the riverside using a fixing post. The blade in water is displaced due to the thrust of flowing water, so as to swing the rotating body a distance. Afterwards, the blade rises to leave the surface of water and swings to its original position. Then, the blade sinks in water to repeatedly receive the thrust of flowing water. The force to swing the blade to its original position is provided by using flowing water to push another blade. The alternate force is resulted from the rotating disk used as a gear. Accordingly, the two blades swing to output continuous power, namely the retrieved energy of flowing water of the present invention. The present invention has advantages of environmental protection, simple structure, and easy installation and maintenance.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A device for retrieving energy of flowing water for the riverside, which is arranged at a riverside of a river, and the device for retrieving energy of flowing water for the riverside comprising:
   a rotating disk;
   a first rotating body and a first blade arranged at a first position of an upstream side of the river;
   a second rotating body and a second blade arranged at a second position of a downstream side of the river;
   a set of first connecting rods fixed to the first rotating body, an end of the set of first connecting rods is connected with the first blade, and another end of the set of first connecting rods is connected with the rotating disk;
   a set of second connecting rods fixed to the second rotating body, an end of the set of second connecting rods is connected with the second blade, and another end of the set of second connecting rods is connected with the rotating disk; and
   wherein water pushes the first blade under a surface of the water to swing from the first position to the second position, thereby rotating the rotating disk and reversely swinging the second blade over the surface of the water from the second position to the first position, the second blade sinks in the water, the water pushes the second blade to swing to the second position and rotate the rotating disk, thereby swinging the first blade over the surface of the water to the first position, and the first blade and the second blade alternately reciprocate and paddle to output a thrust of a stream, wherein the device is configured to be at a same side of the river, the first blade is provided with a paddling rod to sleeve one of the first connecting rods, and the second blade is provided with a paddling rod to sleeve one of the second connecting rods, each of the first rotating body, the second rotating body, and the rotating disk is fixed at the riverside using a fixing post, and the first rotating body is provided with a pulley and a horizontal sliding rod, the pulley is wound by a cord with two ends thereof respectively connected with the first blade and the first rotating body, and the fixing post is provided with a cord pushing rod, the cord pushing rod pushes the cord, and the cord pulls the first blade to rise using the pulley and the horizontal sliding rod.

2. The device for retrieving energy of flowing water for the riverside according to claim 1, wherein the pulley and the horizontal sliding rod are arranged on a fixing board, and the fixing board is fixed to one the first connecting rods and vertical to it.

3. The device for retrieving energy of flowing water for the riverside according to claim 2, wherein the paddling rod is provided with a ratchet base, and an upper surface of the ratchet base is provided with a plurality of ratchet teeth, and the fixing board is provided with a ratchet claw, and the ratchet claw rotates on the fixing board.

4. The device for retrieving energy of flowing water for the riverside according to claim 3, wherein the plurality of ratchet teeth are combined with the ratchet claw, and the ratchet claw rotates by gravity to unidirectionally rotate the plurality of ratchet teeth.

5. The device for retrieving energy of flowing water for the riverside according to claim 1, wherein the second rotating body is provided with a pulley and a horizontal sliding rod, the pulley is wound by a cord with two ends thereof respectively connected with the second blade and the second rotating body, and the fixing post is provided with a cord pushing rod, the cord pushing rod pushes the cord, and the cord pulls the second blade to rise using the pulley and the horizontal sliding rod.

6. The device for retrieving energy of flowing water for the riverside according to claim 5, wherein the pulley and the horizontal sliding rod are arranged on a fixing board, and the fixing board is fixed to one the second connecting rods and vertical to it.

7. The device for retrieving energy of flowing water for the riverside according to claim 6, wherein the paddling rod is provided with a ratchet base, and an upper surface of the ratchet base is provided with a plurality of ratchet teeth, and the fixing board is provided with a ratchet claw, and the ratchet claw rotates on the fixing board.

8. The device for retrieving energy of flowing water for the riverside according to claim 7, wherein the plurality of ratchet teeth are combined with the ratchet claw, and the ratchet claw rotates by gravity to unidirectionally rotate the plurality of ratchet teeth.

* * * * *